United States Patent
Tafas et al.

(10) Patent No.: US 6,320,174 B1
(45) Date of Patent: Nov. 20, 2001

(54) COMPOSING MICROSCOPE

(75) Inventors: Triantafyllos Tafas, New Britain; Petros Tsipouras, Madison, both of CT (US)

(73) Assignee: Ikonisys Inc., New Haven, CT (US)

( * ) Notice: Subject to any disclaimer, the term of this patent is extended or adjusted under 35 U.S.C. 154(b) by 0 days.

(21) Appl. No.: 09/442,172

(22) Filed: Nov. 16, 1999

(51) Int. Cl.[7] .............................. G02B 6/06; G02B 27/00

(52) U.S. Cl. ........................ 250/208.1; 250/216; 359/368

(58) Field of Search .................................. 250/208.1, 216, 250/227.11, 227.2, 227.26, 201.3; 359/368, 372, 373, 374; 385/115, 116, 119

(56) References Cited

U.S. PATENT DOCUMENTS

| | | |
|---|---|---|
| 4,601,537 | 7/1986 | Saccocio . |
| 4,922,092 | 5/1990 | Rushbrooke et al. . |
| 6,121,603 | 9/2000 | Hang et al. . |
| 6,181,474 * | 1/2001 | Ouderkirk et al. .................. 359/629 |

* cited by examiner

*Primary Examiner*—John R. Lee
(74) *Attorney, Agent, or Firm*—Pennie & Edmonds LLP

(57) ABSTRACT

The present invention provides a composing microscope for scanning a large area of a specimen in a minimal amount of time. In a first embodiment, the composing microscope has a plurality of optical sensors and a plurality of optical projecting systems arranged adjacent to each other. Each of the projecting systems acquires an image from one location of a specimen and projects the image on one of the optical sensors for digitalizing the image. An image acquisition device is connected to the optical sensors for simultaneously storing the digitalized images with information of their locations on the specimen. In a second embodiment, a composing microscope has an optical sensor and a plurality of optical projecting systems arranged adjacent to each other in rows. Each of the optical projecting systems has a first end for acquiring an image at one location of a specimen and a second end. An optical reflector moveable with respect to the second ends of the optical projecting systems receives the images from a row of the optical projecting systems at the second ends and projects the images on the optical sensor, and the optical sensor simultaneously digitalizes the images. An image acquisition device simultaneously receives and stores the digitalized images with information of their locations on the specimen. In a third embodiment, a composing microscope has an optical sensor and a plurality of optical projecting systems arranged adjacent to each other. The projecting system has a first end and a second end connected to the optical sensor. Each of the optical projecting systems acquires an image of one location of a specimen at the first end and projects the image on the optical sensor for digitalizing the image. An image acquisition device is connected to the optical sensor for storing the digitalized images with information of their locations on the specimen.

39 Claims, 5 Drawing Sheets

COMPOSING MICROSCOPE

FIELD OF THE INVENTION

The present invention relates generally to optical microscope technology. More particularly, the invention relates to a microscope able to scan a large area of a specimen for acquiring an image thereof in a biological diagnosis application.

BACKGROUND OF THE INVENTION

The evolution of optical microscopes has a long history, and the applications of the optical microscopes have extended beyond research and physicians's practice. In a conventional optical microscope, a single objective lens is used to focus on one location of a specimen carried by a microscopic slide and to acquire an image of the location. Dimensions of the image depend on the magnification and the numerical aperture of the objective lens. The image is viewed through an ocular lens or acquired through a camera. Then the specimen is moved and the same image-taking process is repeated at a new location. However, such process is slow for any application that requires a complete view of the specimen. Hence, there is a demand for scanning a large area of the specimen in a minimal amount of time.

One application in which high speed scanning is needed is to scan microscopical preparations for rare cells, e.g. fetal red blood cells in maternal blood during pregnancy, in prenatal diagnosis of genetic abnormalities. Given the fact that methods that can be used to increase the concentration of such cells in the maternal peripheral blood increase the risk of losing some of the cells, it is advantageous to avoid any increase of the concentration. The average frequency of finding fetal red cells in the maternal peripheral blood is one such cell per one milliliter of blood. In order to identify at least 10 cells, which are needed for an accurate prenatal diagnosis of trisomy 21 (Down syndrome), one needs to scan at least 15 milliliters of blood. A microscopical blood smear carries 50~70 micro liter of blood, and thus it needs 17~20 microscopical blood smears to carry one milliliter of blood. In that regard, about 240 microscopical blood smears are used for 15 milliliters of blood.

A similar need exists in the detection of cancer cells in the peripheral circulation of a patient. The detection of such cells at an early stage can help in a timely prognosis of the disease and increase the efficiency of treatment.

Another application where any kind of enrichment is very difficult, if not impossible, is the detection of specific microorganisms in natural waters. For example, plankton microorganisms in fresh or marine waters are mainly recognized on the basis of their morphological characteristics. Because the majority of species of such microorganisms are still unknown, recording their presence in a particular sample relies mainly on the description of their morphological features. It is often quite difficult to isolate such cells, not to mention further culture them to identify all stages of their biological cycle. It is of the utmost importance for both research and applied purposes (biological monitoring or sanitary monitoring) to have the capacity to scan microscopical preparations of such samples in order to record the presence of these microorganisms.

SUMMARY OF INVENTION

The present invention provides a solution to the existing deficiencies.

In accordance with a first embodiment of the invention, a composing microscope comprises a plurality of optical sensors, a plurality of optical projecting systems arranged adjacent to each other, and an image acquisition device connected to the optical sensors. An illuminating means such as a lamp is used to illuminate a specimen. Each of the projecting systems is connected to one optical sensor and acquires an image of one position of the specimen and projects the image on the optical sensor for digitalizing the image. The image acquisition device simultaneously receives, from the plurality of optical sensors, the digitalized images and store the same with information of their positions on the specimen to form a complete view of the specimen.

In a preferred example of the first embodiment, the optical sensor comprises a charge couple device (CCD) camera, and the optical projecting system comprises an objective lens. It is preferred that the optical projecting system comprises an objective lens and a focusing means such as a computer-controlled auto-focusing mechanism for controlling the focusing of the objective lens. The image acquisition device comprises a component in a computer. The composing microscope further comprises a motorized specimen stage for moving the specimen to be scanned by the optical projecting system and a synchronizing means such as a computer for synchronizing the movement of the specimen stage with image storage rate of the image acquisition device.

In accordance with a second embodiment of the invention, a composing microscope comprises an optical sensor, a plurality of optical projecting systems arranged adjacent to each other in rows, an optical reflector, and an image acquisition device. An illuminating means is used for illuminating a specimen. Each of the optical projecting systems has a first end proximate to the specimen for acquiring an image at one position of the specimen and a second end. The optical reflector receives the images from at least one row of the optical projecting systems at the second ends and projects on the optical sensor. The optical sensor simultaneously digitalizes these images from the optical projecting systems. The optical reflector is moveable with respect to the second ends of the optical projecting systems. The image acquisition device receives and stores the digitalized images with information of their positions on the specimen to form a complete view of the specimen.

The optical sensor, in a preferred example of the second embodiment, is a fast CCD camera or a complementary metal oxide semiconductor (CMOS) active pixel sensor. The CMOS active pixel sensor used has a resolution of no less than 500×500 pixels at an image acquisition rate of no less than 100 frames per second. It is preferred that the CMOS active pixel sensor has a resolution of 1024×1024 pixels at an image acquisition rate of 500 frames per second. The optical projecting system comprises an optical fiber, preferably having an objective lens at the first end of the optical fiber. Moreover, the objective lens may further have a focusing means therefor. The optical reflector is translated in a direction perpendicular to the direction of rows of the second ends of the optical fibers. As an alternative, the optical reflector is moved rotationally along an axis parallel to the direction of the row of said optical fibers. The optical reflector is in the form of a mirror or a prism. The composing microscope further comprises a motorized specimen stage for moving the specimen to be scanned by the optical projecting system and a synchronizing means such as a computer to synchronize the movement of the specimen stage with image acquisition rate of the optical sensor. The image acquisition device comprises a component in a computer.

In accordance with a third embodiment of the invention, a composing microscope comprises an optical sensor, a plurality of optical projecting systems arranged adjacent to each other, and an image acquisition device connected to the optical sensor. An illuminating means such as a lamp is used to illuminate a specimen. Each of the optical projecting systems has a first end and a second end, and the second end is connected to the optical sensor. The optical projecting system acquires an image of one location of a specimen at its first end and projects the image on the optical sensor through the second end. The optical sensor simultaneously receives the images of different positions of the specimen and digitalizes same. The image acquisition device stores the digitalized images with information of their positions on the specimen to form a complete view of the specimen.

The optical sensor, in a preferred example of the third embodiment, is a fast CCD camera or a CMOS active pixel sensor. The CMOS active pixel sensor used has a resolution of no less than 500×500 pixels at an image acquisition rate of no less than 100 frames per second. It is preferred that the CMOS active pixel sensor has a resolution of 1024×1024 pixels at an image acquisition rate of 500 frames per second. Each of the optical projecting systems comprises either a single optical fiber or a bundle of optical fibers. An objective lens is attached at the first end of the optical fiber or optical fibers. In the case of the bundle of optical fibers are used, an objective lens is used for all the optical fibers at its first end. The objective lens may also be equipped with a focusing mechanism. More preferably, the optical projecting system comprises an objective lens, a fiberoptic taper, and a fiberoptic bundle having its first end connected to the objective lens and its second end connected to the fiberoptic taper. The composing microscope further comprises a motorized specimen stage for moving the specimen to be scanned by the optical projecting system and a synchronizing means such as a computer to synchronize the movement of the specimen stage with image acquisition rate of the optical sensor. The image acquisition device comprises a component in a computer.

BRIEF DESCRIPTION OF THE DRAWINGS

These and other features and elements of the present invention will be better understood from the following detailed description of preferred embodiments of the invention in which.

DESCRIPTION OF THE PREFERRED EMBODIMENTS

Figure 1:
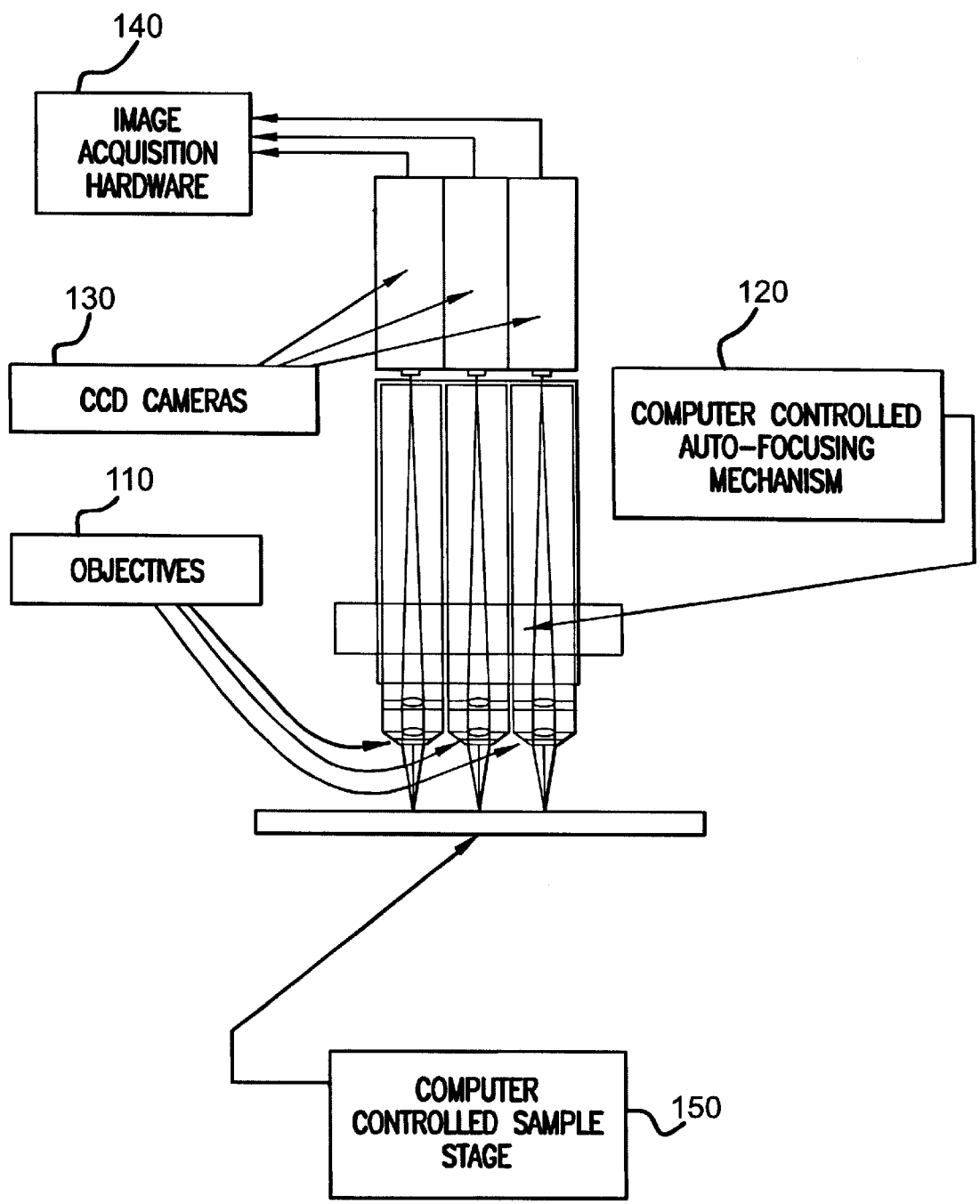
FIG. 1 is a schematic illustration of a composing microscope in accordance with a first embodiment of the present invention.

A composing microscope in accordance with a first embodiment of the invention comprises a plurality of optical sensors, a plurality of optical projecting systems arranged adjacent to each other, and an image acquisition device connected to the optical sensors. Referring to FIG. 1, the optical projecting systems comprises an array of two or more objective lenses 110 having substantially the same optical characteristics. Each objective lens is used to acquire an image of one position of the specimen located underneath the objective lens. The objective lenses are arranged in rows. Each objective lens has its own z-axis movement mechanism 120 so that it is capable of being individually focused. A computer-controlled auto-focusing mechanism is preferred to be used as the z-axis movement mechanism for each objective lens. The microscope may also be equipped with a suitable mechanism so that the multiple objective lenses holder can be exchanged to provide the same variety or range of different magnifications that a common single-lens microscope can cover. Usually, the magnification range of the objective lens used in the composing microscope ranges from 1× to 100×.

Each objective lens is connected to its own optical sensor 130. The image acquired by the objective lens is projected onto the optical sensor for digitalizing the image. A CCD camera is used as the optical sensor in a preferred example. The CCD camera field of view allows it to acquire the full area of the optical field as provided by the objective lens. Each CCD camera is connected to a common image acquisition device 140. The image acquisition device may be made of a hardware component installed in a computer. The image acquisition device records each image acquired from one position of a specimen by one objective lens with its physical location on the specimen.

In a preferred example, a motorized stage 150 is used to provide movement of the specimen to be scanned by the optical projecting system. The motorized stage is preferred to be a computer controlled x-y mechanical stage. The computer synchronizes the moving speed of the specimen stage with the image acquisition rate of the image acquisition device. Hence, as the specimen is illuminated by a light source and moved by the computer controlled x-y mechanical stage, the specimen is scanned by the objective lenses. The objective lenses simultaneously provide the images of different positions of the specimen to the image acquisition device in the computer. The lenses should be appropriately corrected for chromatic aberrations so that the image has stable qualitative characteristics all along its area.

The images of the specimen are in varying physical distance from each other. The distance is a function of the spacing at which the lenses are arranged and depends on the physical dimensions of the lenses. It also depends on the characteristics of the lenses, namely numerical aperture and magnification specifications, which affect the area of the optical field that can be acquired. Therefore, for lenses of varying magnification/numerical aperture, the physical location of the acquired image also varies.

Figure 2:
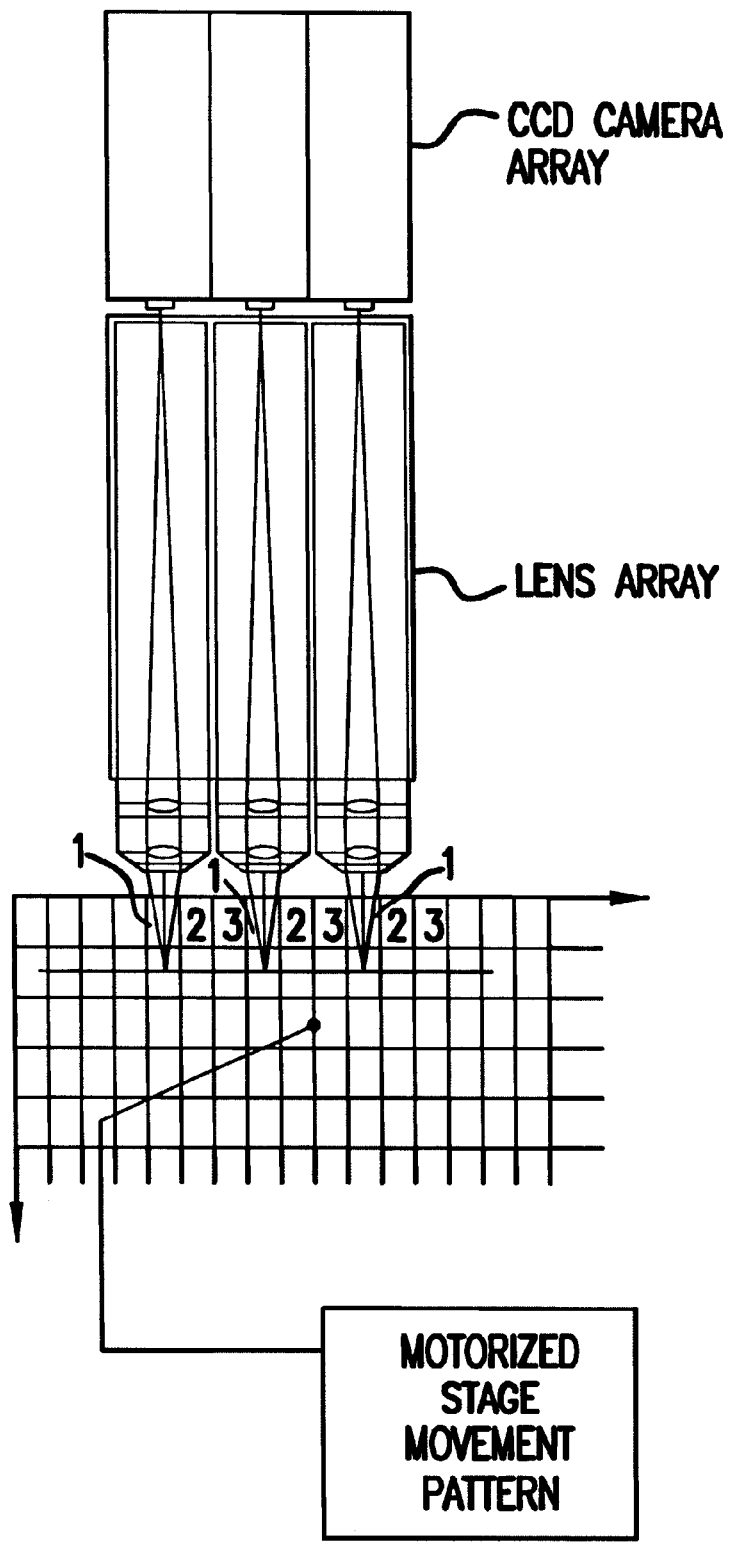
FIG. 2 is a schematic diagram illustrating operating mechanism of the composing microscope in accordance with the first embodiment of the present invention.

The computer keeps track of features of the optical projecting systems in use as well as the position of the motorized stage. The stored characteristics of each image can be used in fitting the image in its correct position in a virtual patchwork, i.e. "composed" image, in the computer memory as shown in FIG. 2. For example, the specimen stage is started at an initial $(x_1,y_1)$ position. Following the acquisition of the images at this position, the specimen stage is moved to a second $(x_2,y_2)$ position in a side-wise manner. Then a new set of images is acquired and stored. As shown in FIG. 2, at the initial step 1, the image segments denoted "1" are captured and stored. In step 2, the segments "2" are stored. In step 3, the segments "3" are stored. The complete image is "composed" in the computer memory as the successive image segments are acquired.

The host computer system that is controlling the above configuration is driven by a software system that controls all mechanical components of the system through suitable device drivers. The software also comprises properly designed image composition algorithms that compose the digitized images in the computer memory and supply the composed image for processing to further algorithms. Through image decomposition, synthesis and image processing, specific features particular to the specific specimen are detected.

Figure 3:
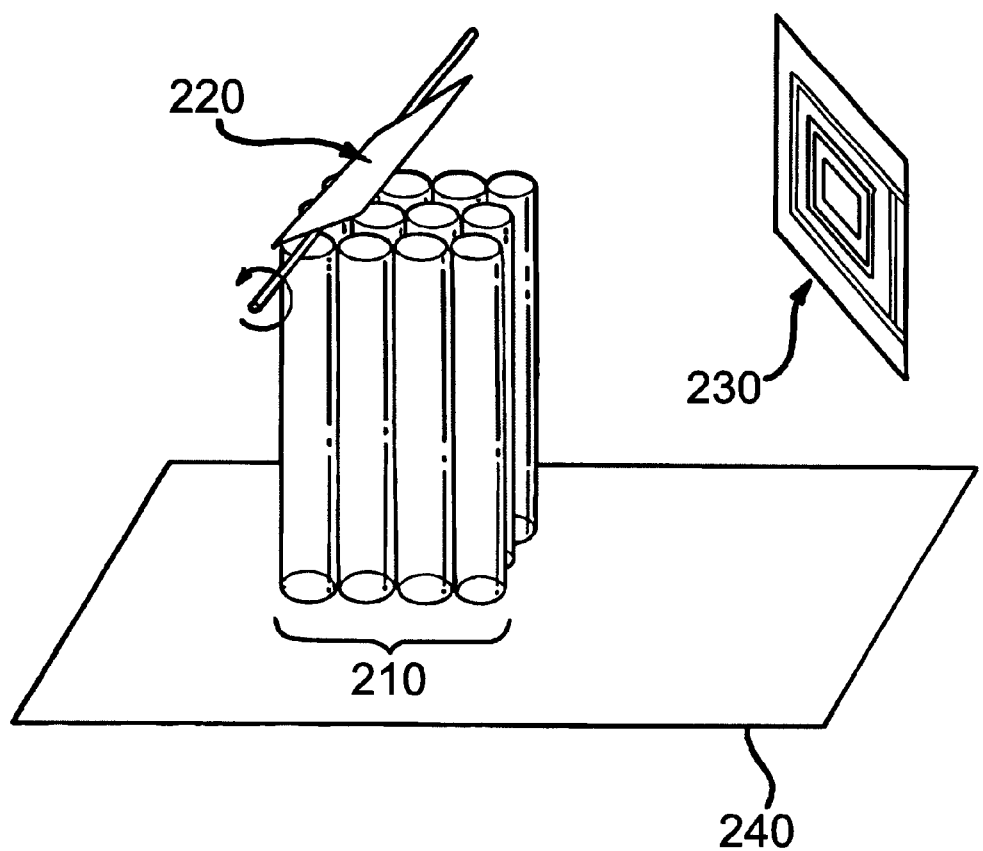
FIG. 3 is a schematic illustration of a composing microscope in accordance with a second embodiment of the present invention.

FIG. 3 depicts a composing microscope in accordance with a second embodiment of the invention. The composing microscope comprises an optical sensor 230, a plurality of optical projecting systems 210 arranged adjacent to each other, an optical reflector 220, and an image acquisition device (not shown in the figure). The optical projecting systems are aligned in rows. Each of the optical projecting systems has a first end and a second end. The first end is arranged proximate to a specimen so that the optical projecting system acquires an image of one position of the specimen. The optical projecting system in this embodiment comprises an optical fiber. Because the optical fiber has a much smaller size compared with a conventional lens configuration, more optical projecting systems can be put in use to cover a larger field area of the specimen. The optical fiber may be attached with an objective lens for better quality of the images of the specimen. In a preferred example, the objective lens is incorporated at the first end of the optical fiber. For information on the optical fiber having the objective lens, one may refer to, for example, U.S. Pat. No. 5,511,141 and 5,664,036, which are incorporated herein by reference. On the other hand, a single objective lens may be used for all the optical fibers. Moreover, the optical projecting system is also equipped with a focusing means for adjusting the distance between the first end of the optical fiber and the plane of the specimen.

The optical reflector is located near the second ends of the optical projecting systems to receive the images for different portions of the specimen and to project the images to the optical sensor. In this illustrative example of this embodiment, a mirror or a prism is used as the optical reflector. The optical reflector is translated in a direction perpendicular to the direction of rows of the optical fibers. As an alternative, the optical reflector may be rotated along an axis along a direction parallel to the direction of the rows of optical fibers. In either motion, the optical reflector is capable of reflecting the images of the specimen from at least one row of optical fibers.

When the images are projected to the optical sensor, it simultaneously digitalizes the images. A fast CCD camera or a CMOS active pixel sensor is used as an exemplary image sensor in this embodiment. The CMOS active pixel sensor used has a resolution of no less than 500×500 pixels at an image acquisition rate of no less than 100 frames per second. It is preferred that the CMOS active pixel sensor has a resolution of 1024×1024 pixels at an image acquisition rate of 500 frames per second. It also has a capability for "on chip" image compression and image stabilization functions.

The composing microscope further comprises a motorized specimen stage 240 on which the specimen is laid. The moving speed of the specimen stage is synchronized with the image acquisition rate of the optical sensor through a computer operation. As the specimen is moved along either direction (x or y direction) in the horizontal plane, the optical projecting systems scan portions of the portions and acquire the images thereof. These images are projected to the optical sensor for simultaneous digitalization. The digitalized images and information regarding their locations are stored in the image acquisition device such as a computer.

A composing microscope in accordance with a third embodiment of the invention comprises an optical sensor, a plurality of optical projecting systems arranged adjacent to each other, and an image acquisition device connected to the optical sensor. An illuminating means such as a lamp is used to illuminate the specimen. The projecting system has a first end and a second end connected to the optical sensor. Each of the optical projecting systems acquires an image of one location of a specimen at its first end and projects on the optical sensor for digitalizing the image. The image acquisition device stores the digitalized images with information of their positions on the specimen.

Figure 4:
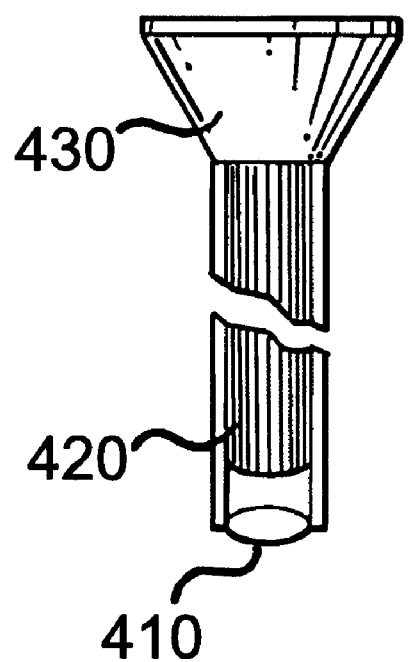
FIG. 4 is a schematic illustration of a preferred optical projecting system used in a composing microscope in accordance with a third embodiment of the present invention.

The optical projecting system comprises either an optical fiber or preferably a bundle of optical fibers. An objective lens is attached at the first end of the optical fiber or the bundle of optical fibers. In the case of the bundle of optical fibers, an objective lens may be used for all the optical fibers at the first ends. The objective lens may also be equipped with a focusing mechanism in this embodiment. FIG. 4 depicts an optical projecting system used in a preferred example of this embodiment. More specifically, the optical projecting system comprises an objective lens 410, a fiberoptic taper 430, and a fiberoptic bundle 420 having its first end connected to the objective lens and its second end connected to the fiberoptic taper. The image on the specimen is collected by the optical lens and transmitted by the fiberoptic bundle and the fiberoptic taper to the optical sensor. The objective lens can be of various magnifications and assorted optical characteristics. In an alternative example, the objective lens may also be a combination of lenses allowing for spatial and chromatic corrections depending on the magnification used.

When many optical projecting systems are arranged adjacent to each other, the tops of the fiberoptic tapers are also arranged next to each other. Thus, the image produced by each of the optical projecting system is projected on the optical sensor and acquired as a combined images every time the optical projecting systems transmit to the image acquisition device in a host computer.

The optical sensor in the embodiment is a CMOS active pixel sensor. The CMOS active pixel sensor may be manufactured by PHOTOBIT Corp., Pasadena, Calif. These sensors feature on-chip analog-to-digital conversion that facilitates driving high speed signals off chip, as well as a number of other important features like on chip image compression. The optical sensor can be manufactured at various sizes. For example, a 10×10 mm with a pixel size of 5 $\mu$m is a preferred example of the optical sensor. In order to achieve a good image quality for applications such as blood cell analysis, a resolution of 500×500 pixels is necessary. Thus, the optical sensor as the one described above can accommodate 16 images at one time.

Figure 5:
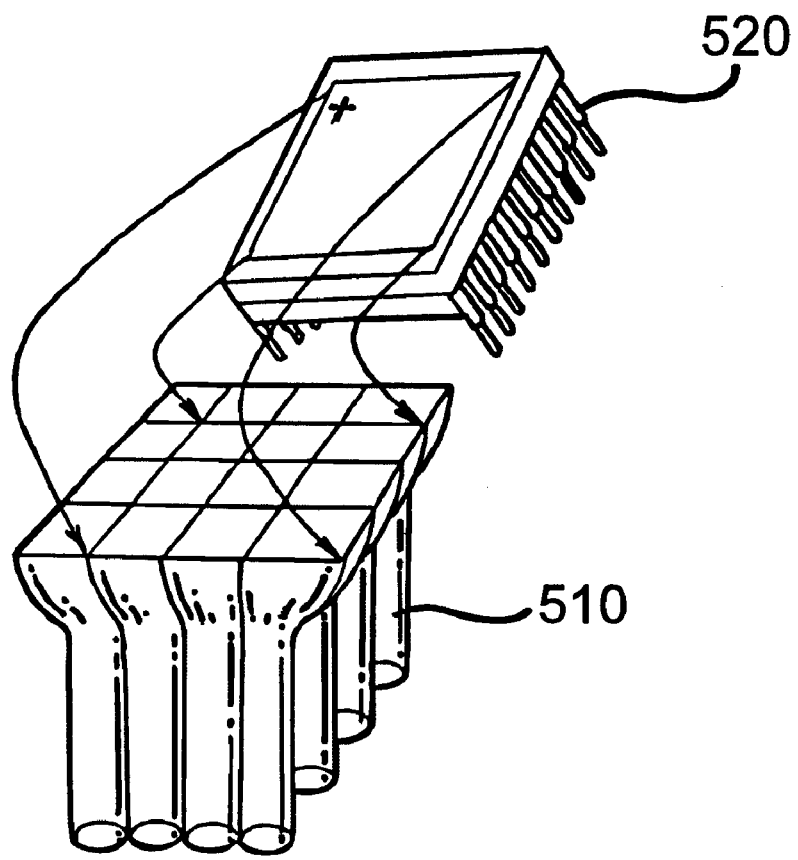
FIG. 5 is a schematic illustration of the connection between an optical sensor and optical projecting systems in the composing microscope in accordance with a third embodiment of the present invention.

FIG. 5 shows an alignment of the optical sensor with the array of the fiberoptic tapers. The optical sensor may be coupled using for example optical grease and epoxy. If coupled with optical grease, the CCD can be aligned to the fiberoptic with a mechanical template and contact can be maintained with a spring loaded assembly. Alternatively a low viscosity epoxy (Tra-Con, Inc., Medford, Mass.) can be used allowing for permanent coupling.

The composing microscope further comprises a motorized specimen stage. The moving speed of the specimen stage is synchronized with the image acquisition rate of the optical sensor through a computer operation. As the specimen is moved along either direction (x or y direction) in the horizontal plane, the optical projecting systems scan various portions of the specimen and acquire the images thereof. These images are projected to the optical sensor for simultaneous digitalization. The digitalized images are stored in the image acquisition device such as a computer with their positions' information.

The optical sensor is suitably connected to the appropriate circuitry so that the images are transferred to the image acquisition device of a host computer. The exact position and coordinates of each of the 16 acquired images are known and depend on the optical characteristics of the projecting system. For example, it can be that images do not depict consecutive areas of the specimen. This happens when the original magnification characteristics of the objective lens system is higher than 20×, e.g. at 40×. The final consecutive image of the magnified specimen is composed in the computer memory, by the imaging software that will reshuffle the acquired images on the basis of their known positional information. Thus, they can be combined on the computer screen to depict a contiguous image.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A composing microscope comprising:
   a plurality of optical sensors;
   a plurality of optical projecting systems arranged adjacent to each other, each of said projecting systems acquiring an image from one location of a specimen and projecting said image on one of said optical sensors for digitalizing said image; and
   an image acquisition device connected to said optical sensors for simultaneously storing said digitalized images with information of their locations on said specimen.

2. The composing microscope according to claim 1, wherein said optical sensor comprises a CCD camera.

3. The composing microscope according to claim 1, wherein said optical projecting system comprises an objective lens.

4. The composing microscope according to claim 1, wherein said optical projecting system comprises an objective lens and a focusing means therefor.

5. The composing microscope according to claim 4, wherein said focusing mechanism is a computer-controlled auto-focusing mechanism.

6. The composing microscope according to claim 1, wherein said image acquisition device comprises a computer.

7. The composing microscope according to claim 1, further comprising a motorized stage for holding said specimen and means for synchronizing the movement of said specimen stage with image storage rate of said image acquisition device.

8. The composing microscope according to claim 7, wherein said synchronizing means comprises a computer.

9. The composing microscope according to claim 1, further comprising an illuminating means for illuminating said specimen.

10. A composing microscope comprising:
    an optical sensor;
    a plurality of optical projecting systems arranged adjacent to each other in rows, each of said optical projecting systems having a first end for acquiring an image at one location of a specimen and a second end;
    an optical reflector moveable with respect to said second ends of said optical projecting systems, said optical reflector receiving said images from a row of said optical projecting systems at said second ends thereof and projecting said image on said optical sensor, and said optical sensor simultaneously digitalizing said images; and
    an image acquisition device for simultaneously receiving and storing said digitalized images with information of their locations on said specimen.

11. The composing microscope according to claim 10, wherein said optical sensor comprises a CCD camera.

12. The composing microscope according to claim 10, wherein said optical sensor comprises a CMOS active pixel sensor.

13. The composing microscope according to claim 12, wherein said CMOS active pixel sensor has a resolution of no less than 1024×1024 pixels at an image acquisition rate of no less than 500 frames per second.

14. The composing microscope according to claim 10, wherein said optical projecting system comprises an optical fiber.

15. The composing microscope according to claim 14, wherein said optical fiber comprises an objective lens at said first end.

16. The composing microscope according to claim 14, wherein said optical fiber comprises an objective lens at said first end and a focusing means therefor.

17. The composing microscope according to claim 10, further comprising a motorized stage for holding said specimen and means for synchronizing the movement of said specimen stage with image acquisition rate of said optical sensor.

18. The composing microscope according to claim 17, wherein said synchronizing means comprises a computer.

19. The composing microscope according to claim 10, wherein said image acquisition device comprises a computer.

20. The composing microscope according to claim 10, wherein said optical reflector comprises a mirror.

21. The composing microscope according to claim 10, wherein said optical reflector comprises a prism.

22. The composing microscope according to claim 10, wherein said optical reflector is moved linearly with respect to said second ends of said optical fibers.

23. The composing microscope according to claim 10, wherein said optical reflector is moved rotationally along an axis parallel to the direction of said row of said optical fibers.

24. The composing microscope according to claim 10, further comprising an illuminating means for illuminating said specimen.

25. A composing microscope comprising:
    an optical sensor;
    a plurality of optical projecting systems arranged adjacent to each other, said projecting system having a first end and a second end connected to said optical sensor, and each of said optical projecting systems acquiring an image of one location of a specimen at said first end and projecting said image on said optical sensor for digitalizing said image; and an image acquisition device connected to said optical sensor for storing said digitalized images with information of their locations on said specimen.

26. The composing microscope according to claim 25, wherein said optical sensor comprises a CCD camera.

27. The composing microscope according to claim 25, wherein said optical sensor comprises a CMOS active pixel sensor.

28. The composing microscope according to claim 27, wherein said CMOS active pixel sensor has a resolution of no less than 1024×1024 pixels at an image acquisition rate of no less than 500 frames per second.

29. The composing microscope according to claim 25, wherein said optical projecting system comprises an optical fiber.

30. The composing microscope according to claim 25, wherein said optical projecting system comprises an optical fiber and an objective lens at said first end thereof.

31. The composing microscope according to claim 25, wherein said optical projecting system comprises a bundle of optical fibers.

32. The composing microscope according to claim 25, wherein said optical projecting system comprises a bundle of optical fibers and an objective lens at said first end thereof.

33. The composing microscope according to claim 25, wherein said optical projecting system comprises a bundle of optical fibers and an objective lens for each of said optical fibers at said first end of said optical projecting system.

34. The composing microscope according to claim 25, wherein said optical projecting system comprises an optical fiber, an objective lens at said first end thereof, and a focusing mechanism for focusing said objective lens with respect to said specimen.

35. The composing microscope according to claim 25, wherein said optical projecting system comprises an objective lens;

a fiberoptic taper; and a fiberoptic bundle having said first end connected to said objective lens and said second end connected to said fiberoptic taper.

36. The composing microscope according to claim 25, further comprising a motorized stage for holding said specimen and means for synchronizing the movement of said specimen stage with image acquisition rate of said optical sensor.

37. The composing microscope according to claim 36, wherein said synchronizing means comprises a computer.

38. The composing microscope according to claim 25, wherein said image acquisition device comprises a computer.

39. The composing microscope according to claim 25, further comprising an illuminating means for illuminating said specimen.

* * * * *